No. 827,058. PATENTED JULY 24, 1906.
L. R. COMPTON.
AUTOMOBILE.
APPLICATION FILED MAR. 5, 1906.
3 SHEETS—SHEET 1.
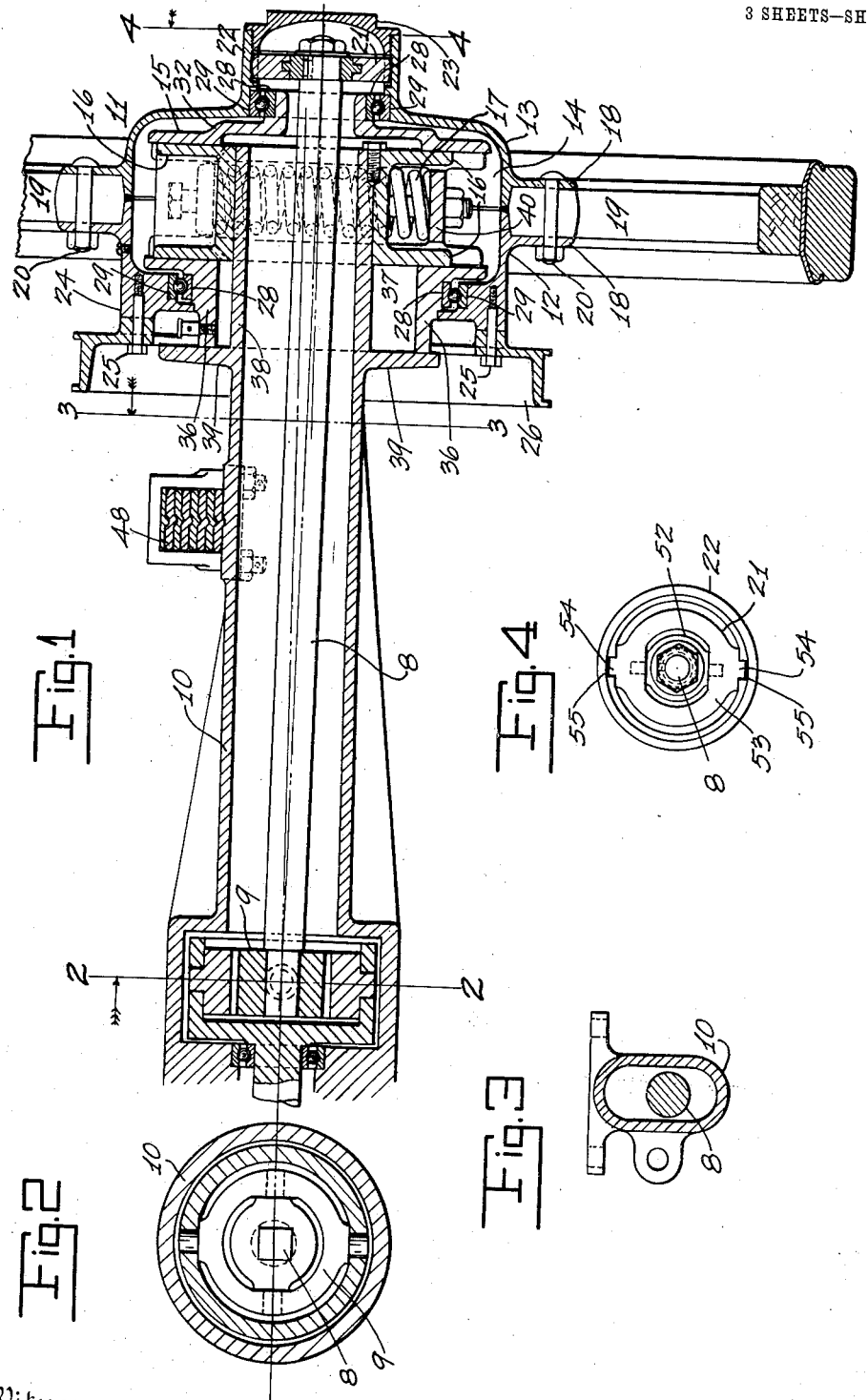
Witnesses
Robert C. Wolff
George L. Schenck.
Inventor
Lewis Ransford Compton
By his Attorney
Chas. C. Gill

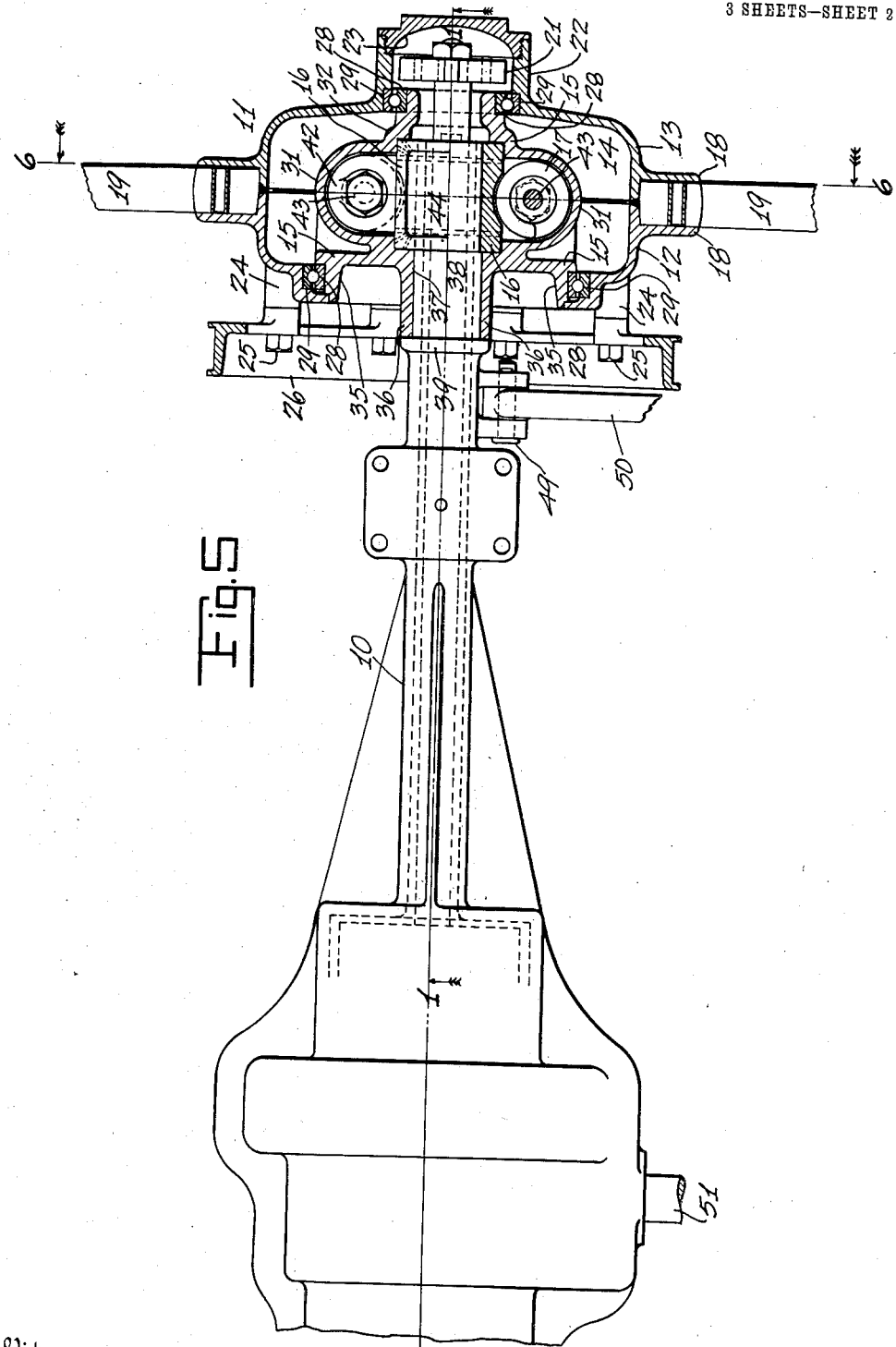

No. 827,058. PATENTED JULY 24, 1906.
L. R. COMPTON.
AUTOMOBILE.
APPLICATION FILED MAR. 5, 1906.
3 SHEETS—SHEET 3.
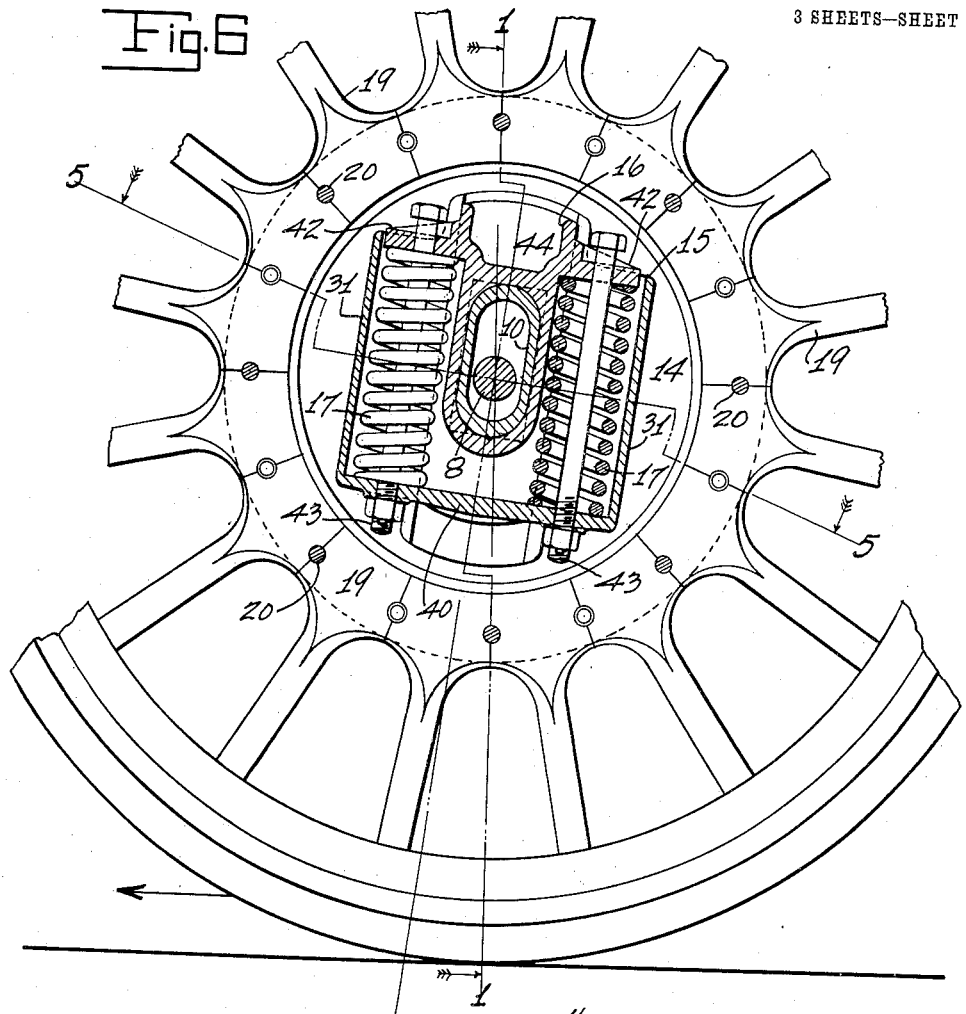
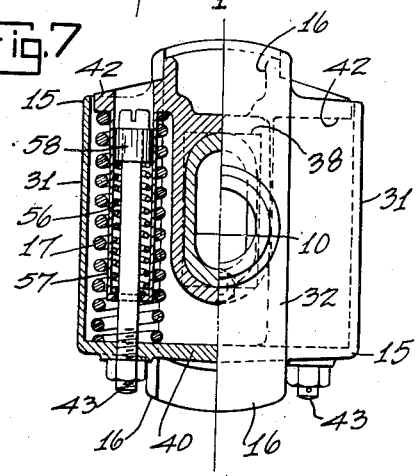
Witnesses
Robert A. Wolff.
George L. Schenck.
Inventor
Lewis Ransford Compton,
By his Attorney
Chas. C. Gill

UNITED STATES PATENT OFFICE.

LEWIS RANSFORD COMPTON, OF EAST ORANGE, NEW JERSEY, ASSIGNOR, BY DIRECT AND MESNE ASSIGNMENTS, OF ONE-HALF TO EDWARD CLIFF AND ONE-HALF TO ALBERT T. PLUMMER, OF NEW YORK, N. Y.; JANE CLIFF ADMINISTRATRIX OF SAID EDWARD CLIFF, DECEASED.

AUTOMOBILE.

No. 827,058.  Specification of Letters Patent.  Patented July 24, 1906.

Application filed March 5, 1906. Serial No. 304,177.

*To all whom it may concern:*

Be it known that I, LEWIS RANSFORD COMPTON, a citizen of the United States, and a resident of East Orange, in the county of Essex and State of New Jersey, have invented certain new and useful Improvements in Automobiles and other Vehicles, of which the following is a specification.

The invention relates to improvements in automobiles and other vehicles; and it consists in the novel features, arrangements, and combinations of parts hereinafter described, and particularly pointed out in the claims.

Among the objects of my invention are more particularly to provide an easy-riding vehicle of the class having a live-axle drive and to provide for the supporting of the load on springs located within the hubs of the wheels.

My invention embodies certain improvements along the line of the inventions described and claimed in Letters Patent No. 792,649, granted Edward Cliff June 20, 1905, and in the pending application, Serial No. 293,241, filed by Edward Cliff December 26, 1905, for Letters Patent for improvements in automobiles and other vehicles.

The present invention pertains to a novel construction and arrangement of parts within the wheel-hub, whereby the wheel may be driven by a live axle of the floating type and the load supported upon springs confined within said hub, and said invention will be fully understood from the detailed description hereinafter presented, reference being had to the accompanying drawings, in which—

Figure 1 is a central vertical section through the hub of a wheel and a portion of the casing containing the drive-axle therefor, the outer end of the axle being shown connected to said hub and the outer end of said casing being illustrated as supported upon coiled springs confined within the hub and sustained upon a frame around which the hub may rotate. Fig. 2 is a vertical section through the axle-casing and contained parts on the dotted line 2 2 of Fig. 1. Fig. 3 is a like section of same on the dotted line 3 3 of Fig. 1. Fig. 4 is an end view of the outer end of the hub with the closing-cap removed and illustrating the universal means connecting the outer end of the live axle to said hub. Fig. 5 is a top view of that part of the axle-casing shown in Fig. 1 with the hub of the wheel in transverse section on the dotted line 5 5 of Fig. 6. Fig. 6 is a vertical section through a portion of the wheel on the dotted line 6 6 of Fig. 5, the outer-face casing of the hub being omitted; and Fig. 7 is a detached elevation, partly in section, of the frames respectively bearing on and supporting the coiled springs within the wheel-hub, Fig. 7 illustrating the application of small reactionary springs intermediate said frames to elongate when the main supporting-springs are compressed and to be compressed when said main springs elongate, whereby the load is, in effect, held in controlled suspension.

In the drawings, 8 designates the live-drive-axle section; 9, a universal connection of usual construction from which said section is, as usual, driven; 10, the stationary axle or axle-casing, and 11 the hub of the wheel, this hub being composed of two vertical cup-sections 12 13, which when brought together form an interior chamber 14 to contain the non-rotatable frame 15 and vertical non-rotatable frame 16, which is rigid on the end of the axle-casing 10 and at its upper opposite edges bears upon the springs 17, which are supported by the frame 15, as clearly shown in Fig. 6.

The hub-sections 12 13 are formed with annular flanges 18, between which is formed a chamber to receive the inner ends of the spokes 19, the latter being secured in position and said sections being fastened together by bolts 20.

The outer hub-section 13 is formed with a central horizontal opening surrounded by a flange 22, adapted to be closed at its outer end by a cap 23 and to contain the universal connection 21, by which the outer end of the axle 8 is connected to said hub, and the details of which (shown in Fig. 4) will be explained hereinafter. The inner hub-section 12 is open at its center and beyond this opening is formed with a series of lugs 24, to which, by means of bolts 25, is secured the brake-flange 26.

The frame 15 is preferably in one integral casting and supports raceways 28, which coöperate with raceways 29, carried by the hub-sections in receiving and retaining the ball-bearings upon which the hub 11 rotates. The hub 11 rotates around the frame 15, and the latter affords a fixed axial center for the wheel and is not movable within said hub.

The frame 15 is formed with semicircular vertical edge sections or boxes 31 to receive the coiled springs 17, and said frame has an outer or front wall 32, from which projects outwardly a circular flange supporting the outer raceway 28 and surrounding an opening in line with the opening in the outer face of the hub-section 13. At its inner end the frame 15 has a circular flange 35, Fig. 1, supporting the inner raceway 28, and also a box-like section 36, Figs. 1 and 5, affording side, top, and bottom walls around a vertically-elongated opening 37, into which a section 38 of the axle-casing 10 projects, said section 38 fitting snugly, but not too tightly, between said side walls and being free of said top and bottom walls, whereby said section 38 permits vertical movement of the wheel-hub and prevents the frame 15 from rotating with said hub. The side walls of the opening 37 extend outwardly to the face of a vertical plate-section 39 of said axle-casing 10, as indicated in Figs. 1 and 5, and, as shown in Fig. 1, said section 39 extends above and below the opening 37 and serves thereby to exclude dust from said opening and also to afford guiding and bearing surfaces for the end of the box-like section 36.

At its lower portion the frame 15 is formed with a horizontal support 40, Figs. 1 and 6, for the coiled springs 17, and at its vertical center the frame 15 is open to receive and guide on the frame 16, which is angular at its corners, as shown in Fig. 5, and fits snugly, but not too tightly, within angular guiding-recesses in the frame 15.

The frame 16 has a horizontal bore and fits upon the end of the axle-casing 10, and at its upper opposite transverse edges said frame 16 is formed with horizontal plates 42, fitting freely within the semicircular sections 31 of the frame 15 and bearing on the coiled springs 17. The plates 42 are apertured to permit the free passage through them of the bolts 43, which are threaded at their lower ends, Fig. 6, and screwed into threaded apertures in the horizontal support 40 for the springs 17. The bolts 43 pass through the springs 17. When the normal weight of the body of the vehicle, acting through the axle-casing 10 and frame 16, is on the springs 17, the latter will be partly compressed and the plates 42 will be below the heads on the bolts 43, as shown in Fig. 6. The lower portion of the frame 16 is open between its sides, as shown in Fig. 1, to receive and permit vertical play of the support 40 for the springs 17.

The frame 16 closes the inner end of the axle-casing opening 37 in the frame 15, and the sides of said frame 16 coöperate with the adjacent surfaces of the frame 15 in affording guiding-surfaces for the vertical movement of the frame 15 with the wheel or the like movement of the frame 16 with the axle-casing 10. In the top of the frame 16 is formed a cup 44 to contain a lubricant which may feed through small openings and lubricate the adjoining guiding-surfaces of the frames 15 16. The frame 16 is preferably fastened upon the end of the axle-casing 10 by means of a key-screw, (shown in Fig. 1,) which enters a threaded socket formed partly in said casing and partly in the frame 16, as shown. The frame 16 cannot rotate with the wheel, because it is fastened to the axle-casing 10, and the frame 15 cannot rotate, because it is held against such movement both by the frame 16 and by the section 38 of the axle-casing. The frame 15, however, partakes of any vertical movement of the wheel and at such time slides vertically on the frame 16 and axle-casing section 38.

Upon the axle-casing 10 is provided a seat for the usual elliptic spring 48, upon which the body of the vehicle is mounted, and said casing is formed with an ear for a pin 49 to receive the usual distance-rod 50, Fig. 5.

In the employment of the invention the ends of the axle-casings 10 become spring-supported, due to the fact that the frame 16 bears upon the springs 17, and the wheel while rotating upon the frame 15 as an axial center, always in fixed relation to the wheel, may have free vertical movement and is cushioned by said springs, the wheel in its vertical movements being guided and kept in true position by the movement of the frame 15 on the frame 16 and axle-casing section 38 and against the face of the plate 39.

The casing 10 is a hollow stationary or non-rotatable frame inclosing at its center the usual differential gearing (not shown) to be set in motion by a usual driving-shaft 51 for actuating the live-axle sections, one of which, 8, is shown. The inner end of each axle-section 8 is connected with the differential by means of a usual universal connection 9, (shown in Figs. 1 and 2,) and which being of customary construction in this art requires no specific description. The outer end of each axle-section 8 is connected with the hub of the wheel by a universal connection 21, so that said section may have its requisite movements and also drive the wheel. The universal connection 21, Fig. 4, comprises the inner and outer parts 52 53, the part 52 being held by usual trunnions in the part 53 and the part 53 having oppositely-disposed studs 54, whose ends in line with the length of the axle are slightly rounded or convex and are seated within grooves 55, formed in the inner walls of the annular flange or sleeve 22 of the wheel-hub. The inner part 52 may turn on its trunnions, and the outer part 53 may rock (not turn axially) on its studs 54, whose outer ends are rounded for that purpose. The universal 21 is maintained in proper position by the cap 23 and small shoulders at the inner ends of the grooves 55, as shown in Fig. 1, there being sufficient clearance between said cap and said shoulders to permit the said part 53 to have a proper rocking movement.

In Fig. 7 I illustrate the application of reactionary springs 56 on the bolts 43 and confined within sleeves 57 integral with the frame 16 and depending from the plates 42 thereof, said sleeves being encompassed by the springs 17 and said springs 56 being confined between the bottom of the sleeves 57 and a loose washer 58, disposed below the head on the bolts 43. When the wheel and frame 15 are caused to move upwardly, the springs 17 become compressed and the springs 56 (due to the elevation of the bolts 43) elongate, and upon the descent of the frame 15 and wheel the springs 17 elongate and the springs 56 become compressed by the descent of the collars 58 against them, whereby any sudden or violent actions of the springs 17, as by the wheels passing over abrupt surfaces, are prevented from affecting the body of the vehicle, the effect of any such actions being controlled within the wheel-hubs.

A further feature in securing an easy-riding vehicle is that the spring-support is preferably inclined forwardly at an angle of, say, from seven to fifteen degrees, as shown in Fig. 6, so that upon the wheel striking an obstruction the thrust will be substantially in line with the length of the springs. The spring-support must not, however, be unduly inclined.

What I claim as my invention, and desire to secure by Letters Patent, is—

1. In a vehicle, the axle-casing entering the hub of the wheel, a spring-support therefor within said hub, and a drive-axle connected to said hub; substantially as set forth.

2. In a vehicle, the axle-casing entering the hub of the wheel, a frame on said casing within said hub, a spring-support for said frame, a frame within said hub for said support and around which the wheel may rotate, and a drive-axle connected to said hub; substantially as set forth.

3. In a vehicle, the axle-casing entering the hub of the wheel, a spring-support therefor within said hub and inclining forwardly at an angle, and a drive-axle connected to said hub; substantially as set forth.

4. In a vehicle, the axle-casing entering the hub of the wheel, a frame on said casing within said hub, a spring-support for said frame and inclining forwardly, a frame within said hub for said support and around which the wheel may rotate, and a drive-axle connected to said hub; substantially as set forth.

5. In a vehicle, the axle-casing entering the hub of the wheel, springs at the sides of the vertical plane thereof and supporting the same, and a drive-axle connected to said hub; substantially as set forth.

6. In a vehicle, the axle-casing entering the hub of the wheel, a frame on said casing within said hub, springs at the sides of the vertical plane of said casing and engaged by and supporting said frame, a frame within said hub and supporting said springs and around which the wheel may rotate, and a drive-axle connected to said hub; substantially as set forth.

7. In a vehicle, a non-rotatable axle entering the hub of the wheel, a spring-support therefor within said hub, and a drive-axle connected to said hub; substantially as set forth.

8. In a vehicle, a non-rotatable axle entering the hub of the wheel, a spring-support therefor within said hub, and a drive-axle connected by a universal connection with said hub; substantially as set forth.

9. In a vehicle, a non-rotatable axle entering the hub of the wheel, a spring-support therefor within said hub and inclined forwardly, and a non-rotatable frame within and around which said hub may rotate and which supports said spring-support; substantially as set forth.

10. In a vehicle, a non-rotatable axle entering the hub of the wheel, a spring-support therefor within said hub, a reactionary spring member within said hub, and a drive-axle connected to said hub; substantially as set forth.

11. In a vehicle, a non-rotatable axle entering the hub of the wheel, a spring-support therefor within said hub, a reactionary spring member within said hub, and a non-rotatable frame encompassing said spring-support and around which the wheel may rotate; substantially as set forth.

12. In a vehicle, a non-rotatable axle entering the hub of the wheel, a frame thereon within said hub, reactionary springs connected with said frame at opposite sides of the vertical plane of said axle, a main spring-support for said frame, and a frame encompassing said spring-support and around which said hub may rotate; substantially as set forth.

Signed at New York city, in the county and State of New York, this 3d day of March, A. D. 1906.

LEWIS RANSFORD COMPTON.

Witnesses:
 CHAS. C. GILL,
 ARTHUR MARION.